US010045170B2

(12) United States Patent
Hu et al.

(10) Patent No.: US 10,045,170 B2
(45) Date of Patent: Aug. 7, 2018

(54) REMOTE USER SUPPORT TOOL

(71) Applicant: ABB Technology Oy, Helsinki (FI)

(72) Inventors: Zhongliang Hu, Espoo (FI); Teemu Tanila, Espoo (FI); Mikko Kohvakka, Espoo (FI)

(73) Assignee: ABB Technology Oy, Helsinki (FI)

( * ) Notice: Subject to any disclaimer, the term of this patent is extended or adjusted under 35 U.S.C. 154(b) by 0 days.

(21) Appl. No.: 15/350,075

(22) Filed: Nov. 13, 2016

(65) Prior Publication Data

US 2017/0142563 A1    May 18, 2017

(30) Foreign Application Priority Data

Nov. 13, 2015 (EP) .................................. 15194420

(51) Int. Cl.
*H04M 3/00* (2006.01)
*H04W 4/18* (2009.01)
*H04M 1/725* (2006.01)

(52) U.S. Cl.
CPC ......... *H04W 4/18* (2013.01); *H04M 1/72522* (2013.01); *H04M 1/72572* (2013.01)

(58) Field of Classification Search
CPC ........................... H04W 4/18; H04M 1/72522; H04M 1/72572

USPC ................... 455/419, 418, 414.1, 415, 422.1
See application file for complete search history.

(56) References Cited

U.S. PATENT DOCUMENTS

| | | | |
|---|---|---|---|
| 2004/0177373 A1* | 9/2004 | Kawabe | G08B 13/19621 725/62 |
| 2006/0061491 A1* | 3/2006 | Qin | G06F 3/0233 341/28 |
| 2013/0115923 A1 | 5/2013 | Earl et al. | |

FOREIGN PATENT DOCUMENTS

GB          2513709 A     11/2014

OTHER PUBLICATIONS

European Search Report and Written Opinion, EP15194420, dated Jan. 15, 2016, ABB Technology Oy, 5 pages.

* cited by examiner

*Primary Examiner* — Nghi H Ly
(74) *Attorney, Agent, or Firm* — Taft Stettinius & Hollister LLP; J. Bruce Schelkopf

(57) ABSTRACT

To provide as data rate independent user experience as possible for remote service, function descriptions are associated with identifiers, and a function plan transmitted between a service center and a user apparatus comprises the identifiers but the function plan outputted in the user apparatus comprises the function descriptions.

19 Claims, 5 Drawing Sheets

REMOTE USER SUPPORT TOOL

FIELD

The present invention relates to remote service support.

BACKGROUND ART

The evolvement of communication technology, particularly wireless communication technology and end user devices, has enabled versatile communication possibilities and introduction of different services. An example of such a service is a remote support for maintenance staff of machines and equipment. There are smartphone applications that allow a user of the smartphone to receive service recommendations for a machine, store operational data on the machine over the network connection, and troubleshoot the machine, for example, from a service center. However, since the amount of data to be transmitted over a network connection between a smartphone and the service center may be rather big, in order to the application function properly, a network connection with high data throughput is needed. Such a network connection is not necessarily available at an industrial site because of shadow regions causing the smart phone to downgrade to use network technology with a lower data rate or because the industrial site locates in an area not yet having a wireless network with high enough data rate.

BRIEF DESCRIPTION

According to an aspect, there is provided the subject matter of the independent claims. Embodiments are defined in the dependent claims.

One or more examples of implementations are set forth in more detail in the accompanying drawings and the description below. Other features will be apparent from the description and drawings, and from the claims.

Some embodiments provide methods, apparatuses, a system and a computer program product for providing as data rate independent user experience as possible so that remote users in a network with small data rate will have substantially similar user experience as users in a network with higher data rate.

BRIEF DESCRIPTION OF THE DRAWINGS

In the following, exemplary embodiments will be described in greater detail with reference to accompanying drawings, in which.

DETAILED DESCRIPTION OF SOME EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

The present invention is applicable to any remote-controllable system that comprises one or more service centers or service desks configured to transmit instructions and recommendations to a remote user apparatus. In the following, maintenance is used as an example of a remote service without restricting the examples to the maintenance.

Figure 1:
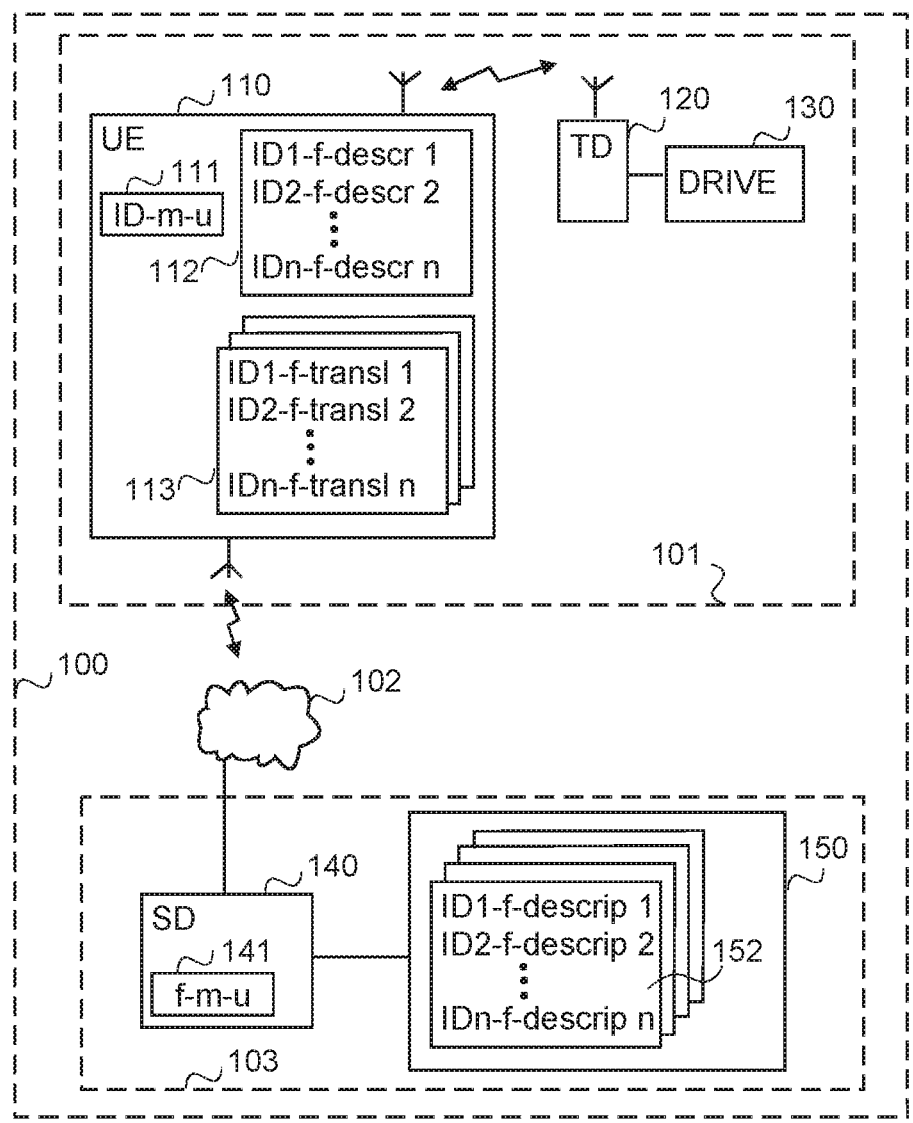
FIG. 1 shows simplified architecture of a system and block diagrams of some apparatuses according to an exemplary embodiment.

An extremely general architecture of an exemplary system 100 is illustrated in FIG. 1. FIG. 1 is a simplified system architecture only showing some elements, functional entities, which are logical units whose implementation may differ from what is shown, and some equipment. It is apparent to a person skilled in the art that the system comprises any number of shown elements, other equipment, other functions and structures that are not illustrated.

In the embodiment illustrated in FIG. 1, the system 100 comprises one or more industrial sites 101 (only one illustrated in FIG. 1) connected over one or more networks 102 to one or more service centers 103 (only one illustrated in FIG. 1).

In the illustrated example the industrial site 101 comprises a user apparatus 110 of a remote user as visiting equipment, and a terminal device 120 and a drive 130 as permanent equipments. The permanent equipment means herein equipment that is intended to locate in the industrial site a long time, whereas the visiting equipment means equipment that is intended to visit the industrial site temporarily. However, it should be appreciated that the user apparatus 110 may be permanent equipment as well. Further, it should be appreciated that the terminal device and the drive depicts herein any device, machine, equipment, system and a process that whose operations and/or service and/or maintenance may be taken care remotely. Other examples of such equipment include frequency converters, AC/DC modules, DC/AC modules, programmable logic controllers, switches, motion controllers or motion drives, servo motors, soft starters, robots, cars, and heavy equipment, etc. It should be appreciated that in the above only some examples are listed.

The user apparatus 110 refers to a portable computing device (equipment), and it may also be referred to as a user terminal, user device, or mobile terminal. Such computing devices (apparatuses) include wireless mobile communication devices operating with or without a subscriber identification module (SIM) in hardware or in software, including, but not limited to, the following types of devices: mobile phone, smart-phone, personal digital assistant (PDA), laptop and/or touch screen computer, tablet (tablet computer) and multimedia device. The user apparatus 110 is configured to support remote maintenance. For that purpose the user apparatus 110 comprises an identifier-mapper-unit (ID-m-u) 111 whose functionality will be described in more detail below, and in the memory for the identifier-mapper-unit 111 at least a set of description associations 112, the set of description associations comprising one or more description associations. In the illustrated example, the memory also comprises for the identifier-mapper-unit one or more sets 113 of translation associations. In set of the description associations 112 an entry (association) associates a function description to an identifier. Examples of description associations will be given below. In the illustrated example, in a set of the translation associations an entry (association)

associates (maps) an identifier to a device-specific set of operations, the set comprising one or more operations. Alternatively, a function description may be mapped to a device-specific set of operations, or a function description may be translated to functions which in turn are translated into device-specific set of operations. To summon up: the description associations are more general type, and similar for devices to which a corresponding functionality can be applied, whereas the translation associations maps the functionality to the language (language version) the device (drive) uses. Further, it should be appreciated that in a distributed solution there may be one or more separate identifier-mapper-units configured to perform identifier mapping related functions, using the description associations, and one or more operation-translator-units configured to perform translation related functions, using the translation associations.

It should be appreciated that the translation associations, or part of them, may be stored to the terminal device and/or to the drive.

In the illustrated example the user apparatus has at least two communications interfaces, depicted by 2 antennas, one to connect to the service center 103 wirelessly over one or more networks 102 and one to connect to the terminal device 120 over a local connection. The wireless connection to the service center may be provided by any mobile system, such as GSM, GPRS, LTE, 4G, 5G and beyond. The local connection may be provided naturally over a mobile system but it may be provided by a direct connection, for example using Bluetooth, or by a local network, like Wi-Fi. It should be appreciated that the user apparatus 110 is depicted to include 2 antennas only for the sake of clarity. The number of reception and/or transmission antennas, or other communication interfaces, may naturally vary according to a current implementation.

The terminal device 120 refers herein to equipment via which parameters of the drive 130 may be adjusted or acquired, and the functions of the drive 130 otherwise controlled by a person locating on the site and/or remotely from the service center. In other words, the terminal device is a module providing at least a wireless interface to which the user apparatus may connect to. The terminal device 120 may be a separate device (as in the illustrated example), or a device detachable connectable to the drive, or equipment integrated to the drive. At the simplest the terminal device may be the mere wireless interface. Other examples of the terminal device include a control panel, smartphone, mobile phone, tablet or laptop computer. At least in the solutions in which the terminal device 120 is not integrated with the drive 130, the terminal device 120 may be located on-site at a close proximity of the drive 130 to which a connection may be provided via a communication interface by Bluetooth, NFC, WiFi and/or inductive connection (such as an inductive connection according to an inductive power standard (Qi) by the Wireless Power Consortium), for example. Further, the terminal device 120 may be able to connect to the service center, for example via the network 102 or via a wired connection. However, the details of the connection, if a connection exists, bear no significance to the invention.

In the illustrated example of FIG. 1 the drive 130 is equipment performing the functionality of a drive according to its settings and has a communication interface via which its parameters may be adjusted or acquired by means of the device terminal 120.

The one or more networks 102 (communications networks) may comprise one or more wireless networks, wherein a wireless network may be based on any mobile system, such as GSM, GPRS, LTE, 4G, 5G and beyond, or a wireless local area network, such as Wi-Fi. Further, the one or more networks 102 may comprise one or more fixed networks and internet.

In the illustrated example the service center 103 comprises a service desk 140 and a database 150. The service desk 140 may be any combination of any user interface, like touch screen or combination of a display and a keypad, and any computing apparatus. Examples of such apparatuses include a work station, a laptop computer, a personal computer, display connected to a server, like a cloud server or a grid server. The service desk 140 is configured to support the remote maintenance. For that purpose the service desk 140 comprises a function-mapper-unit (f-m-u) 141 whose functionality will be described in more detail below, and a connection to the database 150.

The database 150 refers herein to a combination of a data storage and a data management system. The data storage may be any kind of conventional or future data repository, including distributed and centralized storing of data, a cloud-based storage in a cloud environment, managed by any suitable management system. The implementation of the data storage, the manner how data is stored, retrieved and updated are irrelevant to the invention, and therefore not described in detail here. The database 150 comprises for the remote maintenance description associations 152, an entry (association) in the description associations associating a function description to an identifier. The description associations may be general, set machine-specifically, machine type—specifically, machine type and brand—specifically, brand-specifically, etc., and/or be general purpose associations. The description association in the user apparatus is a copy of a corresponding description association in the database. However, the set of description associations in the user apparatus may be a subset of the description associations in the database.

Examples of description associations for a drive include:
1—Panel Firmware Version Read
2—Reset Drive
3—Read Log Drive
4—Update Drive Firmware In the illustrated example the identifiers are numbers. However, also other kind of identifiers, such as alphabets, a combination of numbers and alphabets, etc. may be used; the only prerequisite is that the identifiers are unambiguous within the set. The identifiers should preferably be short since the idea of the identifier is to minimize the size of a function plan sent from the service center to a user apparatus.

Although in the above examples the function descriptions (function definitions, function blocks) are text descriptions, that need not to be the case. A function description in an association may be a graphical symbol, a short video, a combination of graphical symbols, a combination of one or more graphical symbols with text and/or audio, etc. Further, different versions of the function descriptions may be provided by using different output types and/or different languages, the output type being selectable to users. For example, a user in the service center may use function descriptions in English, whereas the user in the remote site may use function descriptions in Spanish.

It should be appreciated that although in the above example the user apparatus comprises only one set of description associations 112 that need not to be the case. The user apparatus may comprise several sets of description associations.

Figure 2:
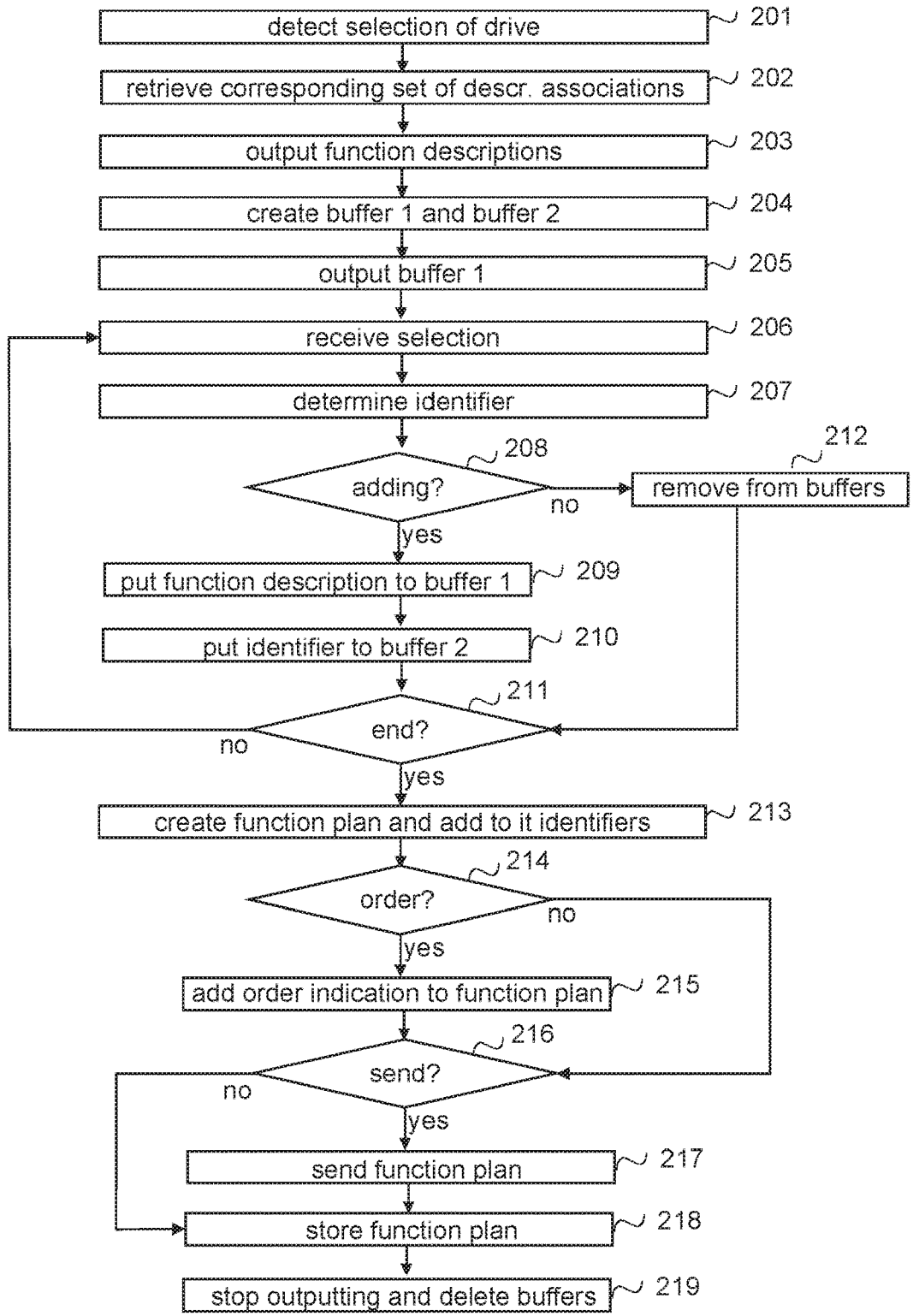
FIGS. 2, 3 and 4 are flow charts illustrating exemplary functionalities.

FIG. 2 illustrates an exemplary functionality of the service desk, or more precisely, functionality of the function-mapper-unit, according to an embodiment. In the illustrated example it is assumed that each functionality has its own function description (function block). A further assumption made is that a function plan contains function descriptions either in a preferable order which is not mandatory to follow or in a mandatory order, without restricting the example to such assumptions.

In the example of FIG. 2 it is assumed that a user of the service desk, called below a service desk operator, has activated a function planning application with which function plans are created and manipulated. The function planning application may comprise the function-mapper-unit or interact with it. Further, in the illustrated example it is assumed that the service desk operator is not amending or viewing an existing function plan but creates a new function plan. Implementing the functionality to manipulate an existing function plan is for one skilled in the art a straightforward process.

Referring to FIG. 2, a user input selecting a drive is detected in step 201, and corresponding set of description associations are retrieved in step 202 from the database. The corresponding set is found based on drive information, for example using information on machine, machine type, brand, etc, depending on generalization level used in the set of description associations. The function descriptions in the set of associations are outputted in step 203 to the service desk operator via a display, for example. At the meantime two temporary buffers, buffer 1 and buffer 2 are created in step 204, and the content of the buffer 1 is outputted in step 205 to the service desk operator via the display, for example. The buffer 1 is for displaying current content of the function plan, and at the beginning it is empty. In other words, in the illustrated example it is assumed that the service desk operator sees the function descriptions available for planning, and the current content of the function plan on one or more displays.

Once a user input indicating selection of a function description is detected (received) in step 206, a corresponding identifier is determined in step 207 using the description associations. It is also checked in step 208, whether or not the selection indicated adding. For example, selecting a function description amongst the function descriptions outputted in "a function description section" in the user interface may indicate adding of the function description, and selecting a function description amongst the function descriptions outputted in "a buffer 1 section" in the user interface may indicate removal of the function description from the function plan. It should be appreciated that other means to indicate adding/removing may be used as well. If the selection indicated adding (step 208) the function description to the function plan, the function description is put in step 209 to a queue in the buffer 1, and the identifier is put in step 210 to a queue in the buffer 2. Hence the buffer 1 has the function descriptions and the buffer 2 the identifiers in the adding order. Further, once added to the buffer 1, the function description will be outputted.

If the next selection is not ending (step 211) the function plan forming, in the illustrated example it is assumed that a next selection of a function description is received and hence the process returns to step 206.

If the selection did not indicate adding (step 208), it indicated a removal of a function description from the function plan. Therefore the function description is removed in step 212 from the buffer 1, and the corresponding identifier is removed in step 213 from the buffer 2. Then the process is ready for the next selection (step 211).

Once the next selection is ending (step 211), a function plan, or a corresponding message, is created in step 213, and the identifiers in the buffer 2 are added to the function plan in step 213. For example, if function descriptions "Read Log Drive" and "Reset Drive" are selected to be performed, the function plan comprises identifiers 3, 2 in the selection order. Hence the function plan comprising the identifiers is much smaller than the one comprising the function descriptions.

In the illustrated example the service desk operator may at any stage indicate whether or not the order of the functions in the function plan is mandatory, the default being non-mandatory. If a user input indicating a mandatory order is received during the planning (step 214), a corresponding indication is added in step 215 to the function plan. The indication may be added by changing a value of one bit, for example.

Then, or if the functions may be performed in a freely selectable order (step 214), it is checked in step 216 whether or not the ending indicated also sending the function plan.

If the user input indicated that the function plan is to be sent (step 216) to a user apparatus, the function-mapper-unit, or the function planning application causes that the function plan is sent in step 217. The user apparatus may be addressed in any known or future way. For example, a certain number may be associated with certain devices, or the user may be prompted to provide the recipient's number, address and/or name. However, since it bears no significance to the invention how the addressing is performed, there is no need to describe it in more detail herein. In the illustrated example, the function plan is also stored in step 218 to the database so that it is associated with the drive. Naturally the outputting of the function plan and the function descriptions is stopped in step 219, and the buffer 1 and the buffer 2 are deleted.

If the user input indicated that the function plan is not to be sent (step 216), the process proceeds directly to step 218 to store the function plan for later retrieval.

Although in the above it is assumed that the service desk operator adds the function descriptions in an intended processing order, and specifically indicates if the intended processing order is to be followed (mandatory) that need not to be the case. For one skilled in the art it is a straightforward process to implement the example to allow more flexible function planning. For example, the service desk operator may freely add the function descriptions in any order, for example between two function descriptions already added, it suffices to maintain the buffer 1 and the buffer 2 in the intended processing order. Further, depending on an implementation, the intended processing order may always be mandatory, in which case no specific indication is needed, or the intended processing order may never be mandatory, or only part (parts) of the intended processing may be indicated to be processed in the order given, for example function 6 in this place only after function 11.

In case the user has retrieved an existing function plan stored to the database to amend it, in step 201 that is detected, and between steps 204 (creating the buffer 1 and the buffer 2) and 205 (outputting the buffer 1), the function descriptions corresponding to the identifiers in the function plan are added to the buffer 1 and the identifiers are added to the buffer 2, and in step 218 the amended function plan is stored to replace the earlier version.

Figure 3:
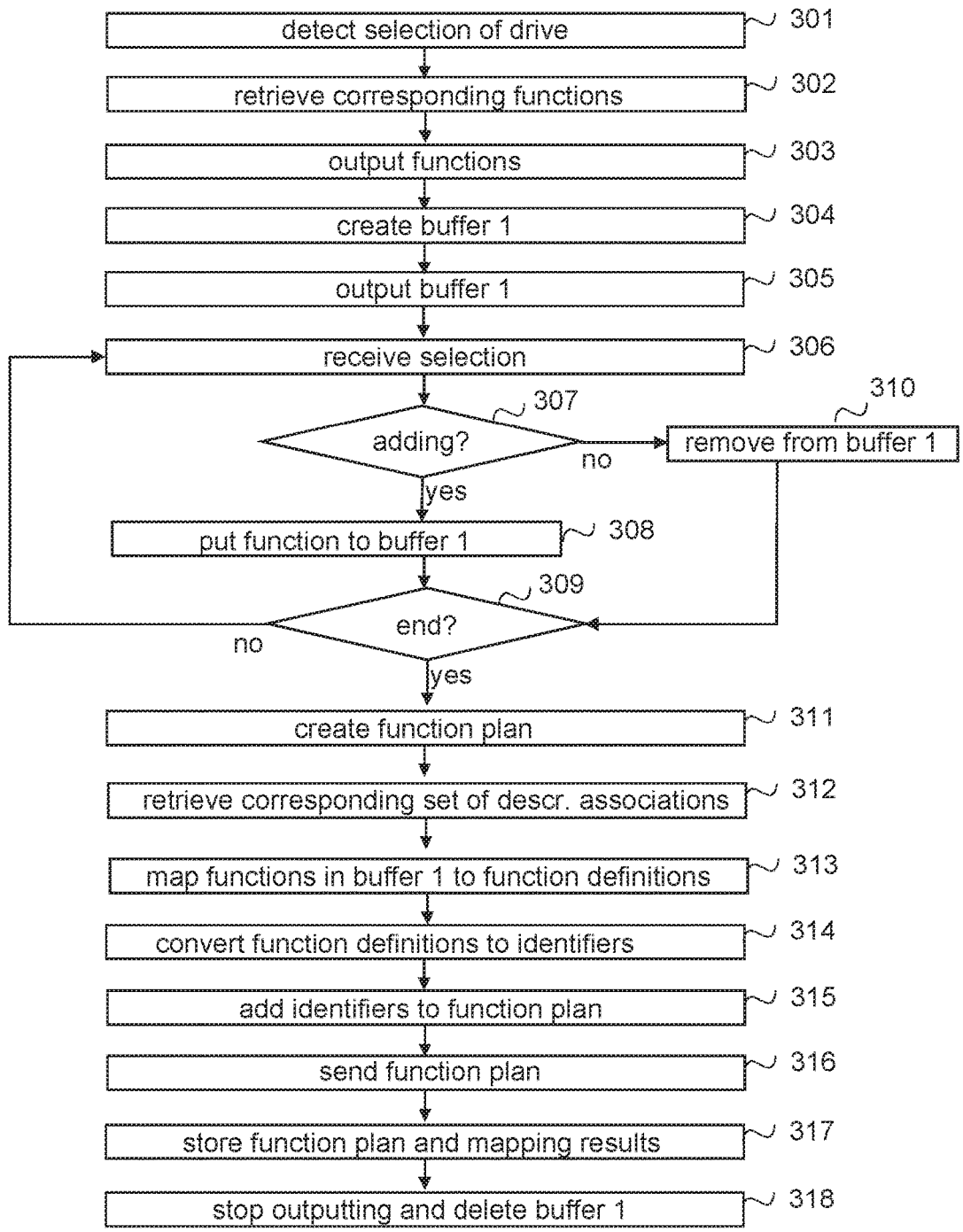

FIG. 3 illustrates another exemplary functionality of the service desk, or more precisely, functionality of the function-mapper-unit, according to another embodiment. In the illustrated embodiment the service desk operator uses functions, including sub-functions, not the function descriptions "hiding" one or more functions, to create a function plan. In the illustrated example it is further assumed that a created function plan is always sent to the user apparatus once created and that a function plan contains function descriptions in an intended order that is not mandatory, without restricting the example and embodiment to such solutions. All flexible alternatives, such as those described above, are usable. Further, as with FIG. 2, also in the example of FIG. 3, it is assumed that the service desk operator has activated the function planning application and that the service desk operator creates a new function plan. Implementing the functionality to manipulate an existing function plan is for one skilled in the art a straightforward process.

Referring to FIG. 3, a user input selecting a drive is detected in step 301, and corresponding functions are retrieved in step 302 from the database. The functions are outputted in step 303 to the service desk operator via a display, for example. At the meantime a temporary buffer 1 is created in step 304, and the content of the buffer 1 is outputted in step 305 to the service desk operator via the display, for example. The buffer 1 is for displaying current functions of the function plan, and at the beginning it is empty. In other words, in the illustrated example it is assumed that the service desk operator sees the functions available for planning and the current functions in the function plan on one or more displays.

Once a user input indicating selection of a function is received in step 306, and the selection indicated adding (step 307) the function to the function plan, the function is put in step 308 to a queue in the buffer 1. Hence the buffer 1 has the function and it will be outputted in the function plan to the service desk operator.

If the next selection is not ending (step 309) the function plan forming, in the illustrated example it is assumed that a next selection of a function is received and hence the process returns to step 306.

If the selection did not indicate adding (step 307), it indicated a removal of a function from the function plan. Therefore the function is removed in step 310 from the buffer 1, and the process is ready to receive next selection (step 309).

If the selection is ending (step 309), a function plan is created in step 311 and a set of description associations for the drive is retrieved in step 312 from the database. Then the functions in the buffer 1 are mapped in step 313 to the function descriptions. Depending on an implementation pre-set rules may be used in the mapping and/or a function description may be further associated with a list of functions the function description contains (if that is the case, also those associations are retrieved), and the list is used in the mapping, and/or any other way to perform the mapping may be used.

Once the functions have been mapped to function descriptions, the function descriptions are in turn converted in step 314 to corresponding identifiers, using the description associations, and the identifiers are added in step 315 to the function plan.

Then the function-mapper-unit, or the function planning application, causes that the function plan is sent in step 316. In the illustrated example, the function plan and the mapping result are also stored in step 317 to the database so that it is associated with the drive. Naturally the outputting of the buffer 1 and the functions is stopped in step 318, and the buffer 1 is deleted.

Figure 4:
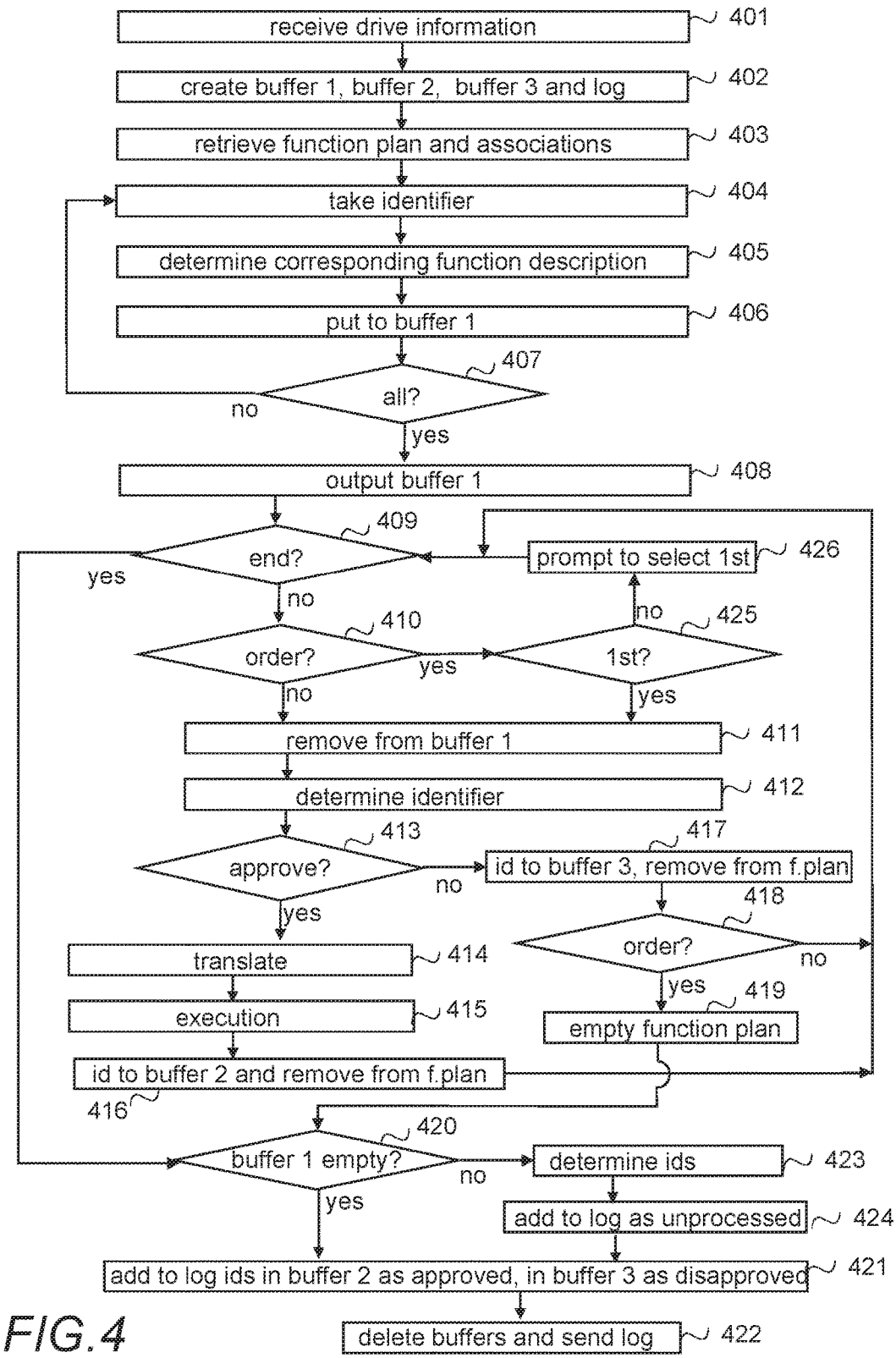

FIG. 4 illustrates an exemplary functionality of the user apparatus, or more precisely, functionality of the identifier-mapper-unit, according to an embodiment. In the illustrated example it is assumed that a user of the user apparatus has activated a remote maintenance application in the user apparatus, the remote maintenance application comprising the identifier-mapper-unit or interacting with it, and that one or more function plans have been received (the site may comprise several drives (devices) the user is assumed to maintain). A further assumption made is that a function plan contains functions either in a preferable order which is not mandatory to follow or in a mandatory order, without restricting the example to such an assumption. Further, it is assumed that the user apparatus has paired with a terminal device to have a Bluetooth connection, or otherwise has established the connection. It should be appreciated that it bears no significance to the invention how the connection between the user apparatus and the terminal device (or the drive) is established. For example, the user apparatus and the terminal device may use a process that is similar to what is disclosed in European patent application nro 15170655.3 assigned to the applicant, and hereby incorporated by reference.

Referring to FIG. 4, when drive information is received in step 401 over the connection between the user apparatus and the terminal device, a temporary buffer 1, a temporary buffer 2, a temporary buffer 3, and a log are created in step 402. Further, a set of description associations and a set of translation associations, which correspond to a drive to which the terminal device is connected to, and a function plan for the drive are retrieved (obtained) in step 403. Then a first unprocessed identifier in the function plan is taken in step 404, and a corresponding function description is determined in step 405 based on the associations in the set of description associations, and put in step 406 to the buffer 1. Then it is checked in step 407 whether or not all identifiers in the function plan are processed. If not, the process proceeds to step 404 to take the first unprocessed identifier. In this way the function descriptions in the buffer 1 are in the same order as in the function plan.

In the illustrated example, once all identifiers are processed (step 407), the buffer 1, or more precisely the function descriptions in the buffer 1, are outputted in step 408 to a user of the user apparatus.

Using the above example, if the function plan comprises identifiers 3, 2 for the drive, function descriptions "Read Log Drive" and "Reset Drive" are outputted via a display. As is evident, the function descriptions are much more understandable to the user than the mere identifiers.

Then a user makes a selection, and a corresponding user input is received and in the illustrated example it is analyzed in step 409, whether the user input is ending or a function description selection.

If the user input is not ending (step 409), it is a function description selection and in the illustrated example it is checked in step 410 whether or not the function plan needs to be performed in the output order. If not, the selected function description is removed in step 411 from the buffer 1 and a corresponding identifier is determined in step 412. Further, in the illustrated example the user is prompted to confirm whether or not he/she approves that the selection is applied to the drive.

If the user input indicates approval (step 413), the function description is translated in step 414 into a drive-specific set of one or more operations, with the help of the set of translation associations. Then the identifier-mapper-unit or the remote maintenance application causes execution (step 415) of the one or more operations. The details of how the one or more operations are executed are irrelevant for the invention, and therefore are not described in detail herein. For example, the user apparatus may send the one or more operations via the terminal device to the drive which then executes the one or more operations without any user involvement, or with user involvement via the terminal device.

During the translation (step 414) and/or the execution (step 415), or after them, the identifier determined in step 412 is added in step 416 to a queue in the buffer 2 and removed in step 416 from the function plan. Then the process proceeds to step 409 to analyze next user input once it is received. However, the earlier selected function descriptions are not outputted to the user (because of removal in step 411) and they are not any more in the function plan (because of removal in step 416). Removal of the function description from the function plan facilitates processing of the function plan so that the user can end the processing of an unfinished function plan, for example in the evening, and can continue without memorizing what has been processed.

If the user input does not indicate approval (step 413), in the illustrated example it indicates disapproval. Therefore the identifier determined in step 412 is added in step 417 to a queue in the buffer 3 and removed in step 417 from the function plan. If the function plan is not to be performed in the output order (step 418), the process proceeds to step 409 to analyze next user input once it is received. However, in the illustrated example, if the function plan needs to be performed in the output order (step 418), the function plan is emptied in step 419 to ensure that the order is followed. Naturally, if the disapproved function description was the last one, the function plan is already empty and nothing happens in step 419.

Then it is checked in step 420, whether or not the buffer 1 is empty. If the buffer 1 is empty, all function descriptions have been processed, and in step 421 identifiers in the buffer 2 are added to the log with an indication that they have been approved and identifiers in the buffer 3 are added to the log with an indication that they have been disapproved. The indication may be identifier-specific or buffer-specific. As a last step in the exemplary processing the buffers (buffer 1, buffer 2 and buffer 3) are deleted in step 422, and, in the illustrated example, the identifier-mapper-unit or the remote maintenance application causes in step 422 that the log is sent to the remote service center.

If the buffer 1 is not empty (step 420), there are unprocessed function description, and their identifiers are determined in step 423 and added in step 424 to the log with an indication that they are unprocessed. Then the process proceeds to step 421 to add content in the other buffers to the log.

After a user input selecting a function description (step 409—no) is received and if the function plan needs to be performed in the output order (step 410), it is checked in step 425, whether or not the selected function description is the first one in the buffer 1. If it is, the process proceeds to step 411 to remove the function description from the buffer 1. If it is not the first one, the user is prompted in step 426 to select the first one, and the process proceeds to step 409 to analyze next user input once it is received.

If the user input is ending (step 409), in the illustrated example the log is updated to reflect what has been approved, what disapproved and what has not been processed. In other words, the process proceeds to step 420 to check whether or not the buffer 1 is empty.

It should be appreciated that the time of approval/disapproval may be associated with the identifier in the corresponding buffer and added to the log file.

Figure 5:
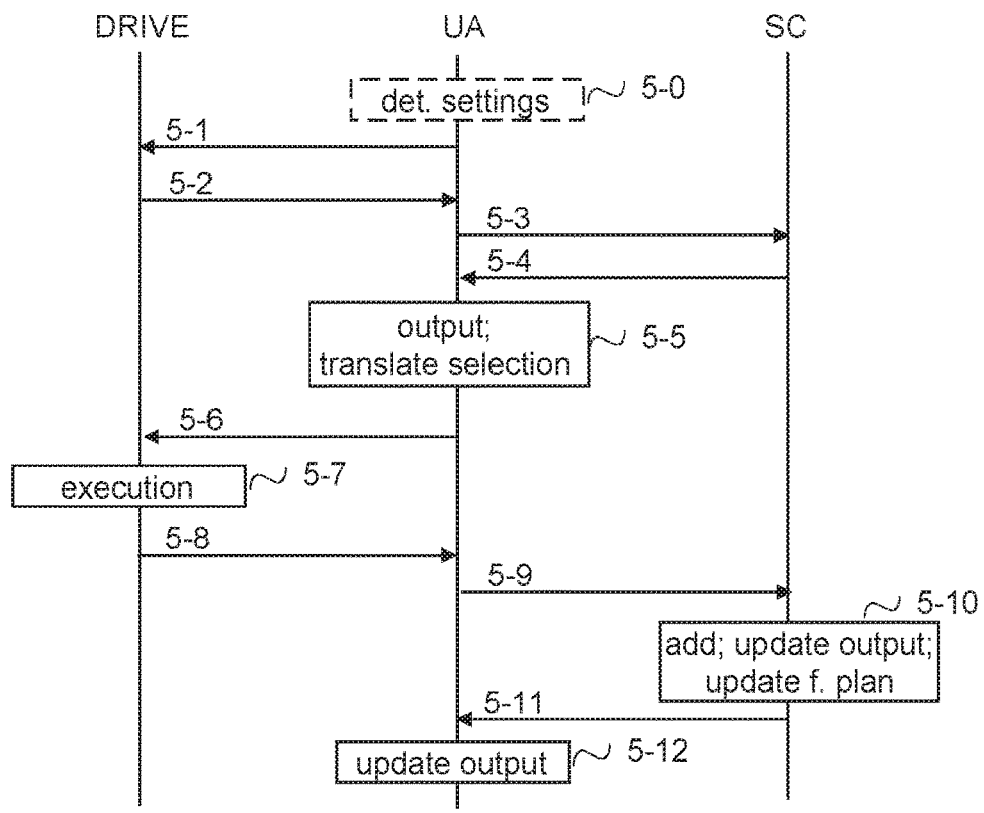
FIG. 5 illustrates exemplary information exchange.

FIG. 5 illustrates information exchange in an exemplary situation in which a function plan is not sent in advance from the service center and the function plan may be updated on the fly. Further, in the illustrated example it is assumed that the terminal device is integrated into the drive, and that they function as one unit, the drive. Yet another assumption made, for the sake of clarity, is that the user agrees with the function plan (i.e. approves his/her selection).

FIG. 5 starts in a situation in which a user in an industrial site turns a user apparatus UA on, and settings, such as used language, are determined in point 5-0. Further, a remote maintenance application is started (not shown in FIG. 5), and the drive has been indicated to be the device to undergo the maintenance process. Therefore UA connects to the drive by sending message 5-1, and once the connection has been established the drive information is sent in message 5-2 to UA. To obtain a function plan for the drive, UA sends message 5-3 to the service center SC. Message 5-3 comprise some information, for example drive type information, or location information, wherefrom SC may automatically deduce information needed to identify a proper function plan and to retrieve it from the database. Once the function plan, comprising the identifiers, is retrieved, it is send to UA in message 5-4.

UA outputs in point 5-5 the function plan, after UA has converted the identifiers to function descriptions in the language indicated in the settings (point 5-0). Further, once a user selection is received, UA translates in point 5-5 the selection to one or more operations understood by a logic in the drive, as described above with FIG. 4. The one or more operations are sent to the drive in message 5-6, and the drive executes, or at least tries to execute it/them in point 5-7. It should be appreciated that information exchange happening as part of the execution is not illustrated herein. For example, the operations may include sending data to SC and/or to UA for later delivery to SC.

In the illustrated example the drive is configured to send information on whether or not the execution succeeded to UA. For example, an ack or a nack is sent in message 5-8. In the illustrated example, UA is configured to inform in real-time SC on the maintenance process. Therefore UA sends message 5-9 containing the result received in message 5-8 with an identifier of the function description whose operations were executed to SC. Message may also contain some other information, like time information. SC in turn adds in point 5-10 the information to the function plan so that it reflects the current state.

In the illustrated example, it is assumed that the current state of the function plan is outputted, using the function descriptions, to the service desk operator who monitors the maintenance work. Therefore, in addition to add the information to the function plan, the function description corresponding to the identifier, is determined and the information is outputted to the service desk operator so that it is clearly associated with the function description (or functions behind the function description, if functions are used in planning).

Further, in the example it is assumed that the result received in message 5-9 is nack, and therefore the service desk operator updates the function plan, using the function descriptions (or functions) which are mapped to identifiers, as described above with FIGS. 2 and 3. For example, there may be an alternative way to perform the intended maintenance step, which failed. In the illustrated example SC is configured to, in response to detecting update (point 5-10)

performed by the service desk operator to the function plan, send message 5-11 to update the function plan in UA correspondingly. Message 5-11 may contain identifier(s) of the function description(s) added as update, or identifier(s) of the function description(s) not yet executed, including the ones added in the update, for example.

UA is configured to update the function plan and output updated function descriptions in point 5-12 correspondingly.

As is evident from the above examples, much less information, compared to a situation in which function descriptions are transmitted from the service center to the user apparatus, needs to be transmitted. Hence even short messages may be used to transmit the information, thereby ensuring that the data rate of a network on a site do not affect to the reception of a function plan, and the user in the remote site will not be frustrated because of a loading time of the function plan. One may even say that the user experience is the same regardless of the data rate of the network. A further advantage is that less network resources are used. Yet the user apparatus will output the function plan in a form that is easily understandable by the user. Thanks to that one can avoid the maintenance errors caused by the user remembering wrong what a specific code means for a machine.

The steps, points, information exchange (messages) and related functions described above in FIGS. 2 to 5 are in no absolute chronological order, and some of the steps/points may be performed simultaneously or in an order differing from the given one. For example, in the example illustrated in FIG. 3 the functions may be mapped to function descriptions while new functions are selected for the function plan. Another example is to output an ordered function plan to the user interface of the user apparatus one function description at a time, in which case converting the identifiers to function plan may happen while a function description is outputted. Still a further example includes that a function description may be translated/converted to "drive language" before it is checked, whether or not the user approved to execute the function description. Other functions can also be executed between the steps/points or within the steps/points, or after the steps/points, and other information may be sent. For example, translating/converting the function description may be performed in a more step-wise manner: the user apparatus converts them to "terminal device language", and the terminal device converts them to "drive language". Another example is that the service desk operator may be alerted if the log contains disapproved identifiers or if "real-time feedback" contains an indication of disapproval or failure. Some of the steps/points or part of the steps/points can also be left out or replaced by a corresponding step/point or part of the step/point. For example, if a user selection always means also approval, there is no need to perform steps 413, 417, 418 and 419. Another example is that there is no need to store mapping results in embodiments based on the example illustrated in FIG. 3. Still a further example is to skip over the storing of function plan in the example illustrated in FIG. 2, if the function plan is sent.

Although in the above terms "function" and "function plan" has been used, corresponding terms, like "action" and "action plan", or "operation" and "operation plan" may be used as well.

It should be appreciated that although all examples mention maintenance, all embodiments and examples are implementable also for operation and/or service of a device/machine or a system or a process.

The techniques described herein may be implemented by various means so that an apparatus implementing one or more functions/operations of a user apparatus or service center described above with an embodiment/example, for example by means of FIGS. 2, 3, 4, and/or 5, comprises not only prior art means, but also means for implementing the one or more functions/operations of a corresponding functionality described with an embodiment, for example by means of FIGS. 2, 3, 4 and/or 5, and it may comprise separate means for each separate function/operation, or means may be configured to perform two or more functions/operations. For example, one or more of the means and/or the identifier-mapper-unit and/or the function-mapper-unit for one or more functions/operations described above may be software and/or software-hardware and/or hardware and/or firmware components (recorded indelibly on a medium such as read-only-memory or embodied in hard-wired computer circuitry) or combinations thereof. Software codes may be stored in any suitable, processor/computer-readable data storage medium(s) or memory unit(s) or article(s) of manufacture and executed by one or more processors/computers, hardware (one or more apparatuses), firmware (one or more apparatuses), software (one or more modules), or combinations thereof. For a firmware or software, implementation can be through modules (e.g., procedures, functions, and so on) that perform the functions described herein.

Figure 6:
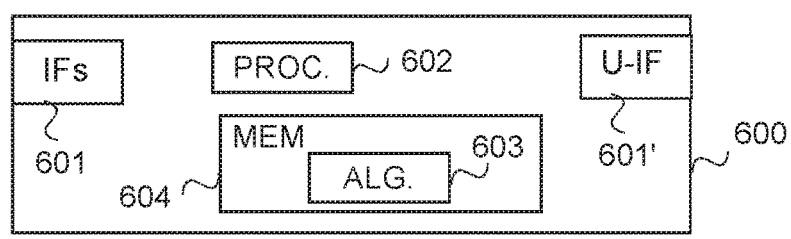
FIGS. 6 and 7 are block diagram of exemplary apparatuses.

FIG. 6 is a simplified block diagram illustrating some units for an apparatus 600 configured to be a user apparatus, comprising at least the identifier-mapper-unit, or configured otherwise to perform functionality of the user apparatus described above, for example by means of FIG. 4 and/or FIG. 5, or some of the functionalities as a sub-unit if functionalities are distributed between the user apparatus and the terminal device/drive, for example. In the illustrated example, the apparatus comprises interface (IF) entities 601 for receiving and transmitting information, one or more user interface (U-IF) entities 601' for user interaction, an entity 602 capable to perform calculations and configured to implement at least the identifier-mapper-unit described herein, or at least part of functionalities/operations described above with the user apparatus, for example by means of FIG. 4 and/or FIG. 5, as a corresponding unit or a sub-unit if distributed scenario is implemented, with corresponding algorithms 603, and memory 604 usable for storing a computer program code required for the identifier-mapper-unit, or a corresponding unit or sub-unit, or for one or more functionalities/operations described above, for example by means of FIG. 4 and/or FIG. 5, i.e. the algorithms for implementing the functionality/operations of the user apparatus described above by means of FIG. 4 and/or FIG. 5. The memory 604 is also usable for storing other possible information, like user settings, logs, different function plans, etc. The entity 602 may be a processor, unit, module, etc. suitable for carrying out embodiments or operations described above, for example by means of FIG. 4 and/or FIG. 5. The identifier-mapper-unit, as well as corresponding units and sub-units may be separate units, even located in different physical apparatuses, and/or integrated to another unit in one apparatus.

Figure 7:
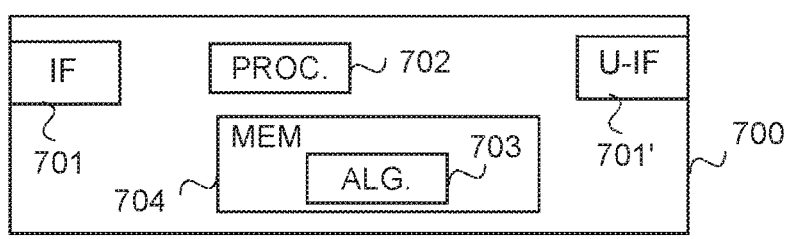

FIG. 7 is a simplified block diagram illustrating some units for an apparatus 700 configured to be a service desk in the service center, comprising at least the function-mapper-unit, or configured otherwise to perform functionality described above as service desk/service center functionalities/operations, for example by means of FIG. 2 and/or FIG. 3 and/or FIG. 5, or some of the functionalities if functionalities are distributed in the future. In the illustrated example, the apparatus comprises at least one interface (IF) entity 701 for receiving and transmitting information, one or more user interface (U-IF) entities 701' for user interaction, an entity 702 capable to perform calculations and configured to implement at least the function-mapper-unit described herein, or at least part of functionalities/operations described above as service desk/service center functionalities/operations, for example by means of FIG. 2 and/or FIG. 3 and/or FIG. 5, as a corresponding unit or a sub-unit if distributed scenario is implemented, with corresponding algorithms 703, and memory 704 usable for storing a computer program code required for the function-mapper-unit, or a corresponding unit or sub-unit, or for one or more functionalities/operations described above as service desk/service center functionalities/operations, for example by means of FIG. 2 and/or FIG. 3 and/or FIG. 5, i.e. the algorithms for implementing the functionality/operations described above by means of FIG. 2 and/or FIG. 3 and/or FIG. 5. The memory 704 is also usable for storing other possible information, like information on performed maintenance actions. The entity 702 may be a processor, unit, module, etc. suitable for carrying out embodiments or operations described above, for example by means of FIG. 2 and/or FIG. 3 and/or FIG. 5. The function-mapper-unit, as well as corresponding units and sub-unit, and/or entities described above with the service desk/service center may be separate units, even located in different physical apparatus, and/or integrated to another unit in one apparatus.

In other words, an apparatus configured to provide one or more corresponding functionalities described above, for example by means of FIG. 2 and/or FIG. 3 and/or FIG. 4 and/or FIG. 5, is a computing device that may be any apparatus or device or equipment or node configured to perform one or more of corresponding apparatus functionalities described with an embodiment/example above, and it may be configured to perform functionalities from different embodiments/examples.

The apparatus configured to provide one or more corresponding functionalities described above, for example by means of FIG. 2 and/or FIG. 3 and/or FIG. 4 and/or FIG. 5, may generally include a processor, controller, control unit, micro-controller, or the like connected to a memory and to various interfaces of the apparatus. Generally the processor is a central processing unit, but the processor may be an additional operation processor. Each or some or one of the units/sub-units and/or algorithms for functions/operations described herein, for example by means of FIG. 2 and/or FIG. 3 and/or FIG. 4 and/or FIG. 5, may be configured as a computer or a processor, or a microprocessor, such as a single-chip computer element, or as a chipset, including at least a memory for providing storage area used for arithmetic operation and an operation processor for executing the arithmetic operation. Each or some or one of the units/sub-units and/or algorithms for functions/operations described above, for example by means of FIG. 2 and/or FIG. 3 and/or FIG. 4 and/or FIG. 5, may comprise one or more computer processors, application-specific integrated circuits (ASIC), digital signal processors (DSP), digital signal processing devices (DSPD), programmable logic devices (PLD), field-programmable gate arrays (FPGA), and/or other hardware components that have been programmed and/or will be programmed by downloading computer program code (one or more algorithms) in such a way to carry out one or more functions of one or more embodiments/examples. An embodiment provides a computer program embodied on any client-readable distribution/data storage medium or memory unit(s) or article(s) of manufacture, comprising program instructions executable by one or more processors/computers, which instructions, when loaded into an apparatus, constitute the identifier-mapper-unit or the function-mapper-unit or an entity providing corresponding functionality or some of the functionalities as a sub-unit. Programs, also called program products, including software routines, program snippets constituting "program libraries", applets and macros, can be stored in any medium and may be downloaded into an apparatus. In other words, each or some or one of the units/sub-units and/or the algorithms for one or more functions/operations described above, for example by means of FIG. 2 and/or FIG. 3 and/or FIG. 4 and/or FIG. 5, may be an element that comprises one or more arithmetic logic units, a number of special registers and control circuits.

Further, the apparatus configured to provide one or more corresponding functionalities described above, for example by means of FIG. 2 and/or FIG. 3 and/or FIG. 4 and/or FIG. 5, may generally include volatile and/or nonvolatile memory, for example EEPROM, ROM, PROM, RAM, DRAM, SRAM, double floating-gate field effect transistor, firmware, programmable logic, etc. and typically store content, data, or the like. The memory or memories may be of any type (different from each other), have any possible storage structure and, if required, being managed by any database management system. In other words, the memory may be any computer-usable non-transitory medium within the processor, or corresponding entity suitable for performing required operations/calculations, or external to the processor or the corresponding entity, in which case it can be communicatively coupled to the processor or the corresponding entity via various means. The memory may also store computer program code such as software applications (for example, for one or more of the units/sub-units/algorithms) or operating systems, information, data, content, or the like for the processor or the corresponding entity to perform steps associated with operation of the apparatus in accordance with examples/embodiments. The memory, or part of it, may be, for example, random access memory, a hard drive, or other fixed data memory or storage device implemented within the processor/apparatus or external to the processor/apparatus in which case it can be communicatively coupled to the processor/network node via various means as is known in the art.

The apparatus configured to provide one or more corresponding functionalities described above, for example by means of FIG. 2 and/or FIG. 3 and/or FIG. 4 and/or FIG. 5, may generally comprise different interface units, such as one or more receiving units and one or more sending units. The receiving unit and the transmitting unit each provides an interface entity including a transmitter and/or a receiver or any other means for receiving and/or transmitting information, and performing necessary functions so that the information, etc. can be received and/or sent.

It will be obvious to a person skilled in the art that, as technology advances, the inventive concept can be implemented in various ways. The invention and its embodiments are not limited to the examples described above but may vary within the scope of the claims.

The invention claimed is:
1. A computerized method comprising:
maintaining in a memory of a user apparatus at least one set of associations, an association in a set of associations associating an identifier of a function to a function description of the function, the identifier being unambiguous within the set of associations;
receiving, by the user apparatus, from a first apparatus, other than the user apparatus, a function plan comprising one or more identifiers of corresponding one or more functions;

converting, by the user apparatus, an identifier of a function in the function plan received to a corresponding function description of the function, by using a set of associations amongst the at least one set of associations in the memory of the user apparatus; and outputting, by the user apparatus, the function description of the function to a user of the user apparatus.

2. The method of claim 1, wherein the function plan is received for a second apparatus, other than the user apparatus and the first apparatus, and the method further comprises:

maintaining in the memory of the user apparatus at least one set of translation associations, a translation association providing means to translate a function description to one or more operations executable by the second apparatus;

translating, by using the translation associations, in response to receiving a user input indicating a selection of a function description, the function description to corresponding one or more operations executable by the second apparatus; and causing the second apparatus to execute the one or more operations.

3. The method of claim 2, further comprising:

checking, whether or not the user input indicated approval of the function description; and performing the causing only in response to the user input indicating approval.

4. The method of claim 3, further comprising:

performing the translating only in response to the user input indicating approval.

5. The method of claim 1, further comprising:

collecting processing information on function descriptions of functions corresponding to the one or more identifiers of corresponding one or more functions in the function plan received; and sending processing information associated with a corresponding identifier to the first apparatus.

6. The method of claim 1, further comprising:

sending from the user apparatus to the first apparatus a request for the function plan; and receiving in the user apparatus from the first apparatus the function plan as a response to the request.

7. The method of claim 1, further comprising:

receiving in the first apparatus a request for the function plan for the second apparatus from the user apparatus; and causing the sending in response to the request.

8. A computerized method comprising:

receiving, by a first apparatus, as a user input, one or more function description selections for a second apparatus, other than the first apparatus;

retrieving, by the first apparatus, from a memory at least one set of associations, an association in a set of associations associating an identifier of a function to a function description of the function, the identifier being unambiguous within the set of associations;

converting the one or more function description selections into corresponding identifiers of functions according to the one or more function description selections;

adding, by the first apparatus, the one or more identifiers of corresponding one or more functions to a function plan for the second apparatus; and causing sending the function plan comprising the identifiers of functions from the first apparatus to a user apparatus, other than the second apparatus.

9. The method of claim 8, wherein a function description comprises one or more functions and the method further comprises:

receiving the one or more function description selections as separate functions; and converting the functions to the one or more function descriptions.

10. The method of claim 8, further comprising:

receiving in the first apparatus from the user apparatus information relating to the function plan, the information comprising one or more identifiers of corresponding functions associated with corresponding processing information;

converting the one or more identifiers of the corresponding functions to corresponding one or more function descriptions of the corresponding functions; and outputting the one or more function description of the corresponding functions with corresponding processing information received.

11. A non-transitory computer-readable program storage medium with a computer program product comprising program instructions which, when run on a computing apparatus comprising in a memory at least one set of associations, an association in a set of associations associating an identifier of a function to a function description of the function, the identifier being unambiguous within the set of associations, causes the computing apparatus to convert an identifier of a function in a received function plan comprising one or more identifiers of corresponding functions to a corresponding function description of the function, by using a set of associations in the memory, and to output the function description to a user of the user apparatus.

12. A user apparatus comprising at least one processor; and one memory including computer program code, wherein the at least one memory and the computer program code are configured to, with the at least one processor, cause the user apparatus at least to:

maintain in the memory at least one set of associations, an association in a set of associations associating an identifier of a function to a function description of the function, the identifier being unambiguous within the set of associations;

convert an identifier of a function in a received function plan, the function plan comprising one or more identifiers of corresponding one or more functions, to a corresponding function description of a corresponding function, by using a set of associations in the memory; and output the function description of the function to a user of the user apparatus.

13. The user apparatus of claim 12, wherein the at least one memory and the instructions are configured to, with the at least one processor, further cause the apparatus to:

maintain in the memory at least one set of translation associations, a translation association providing means to translate a function description of a function in a function plan for first apparatuses to one or more operations executable by a first apparatus;

translate, by using the translation associations, in response to receiving a user input indicating a selection of a function description, the function description to corresponding one or more operations executable by the first apparatus; and cause the first apparatus to execute the one or more operations.

14. The user apparatus of claim 12, wherein the at least one memory and the instructions are configured to, with the at least one processor, further cause the apparatus to:
collect processing information on function descriptions of functions corresponding to the one or more identifiers of corresponding functions in the function plan; and
send processing information of a function associated with a corresponding identifier of the function to a second apparatus wherefrom the function plan was received.

15. A remote service apparatus comprising at least one processor; and one memory including computer program code, wherein the at least one memory and the computer program code are configured to, with the at least one processor, cause the remote service apparatus at least to:
retrieve from the memory at least one set of associations, an association in a set of associations associating an identifier of a function to a function description of the function, the identifier being unambiguous within the set of associations;
convert one or more function description selections, received as a user input for at least one first apparatus, into corresponding identifiers of functions;
add the one or more identifiers of corresponding one or more functions to a function plan for the at least one first apparatus; and
cause sending the function plan comprising the one or more identifiers of the corresponding one or more functions to a user apparatus, other than the first apparatus.

16. The remote service apparatus of claim 15, wherein the at least one memory and the instructions are configured to, with the at least one processor, further cause the remote service apparatus to:
convert, in response to receiving from the user apparatus information relating to the function plan, the information comprising one or more identifiers of functions associated with corresponding processing information, the one or more identifiers of the functions to corresponding one or more function descriptions of the corresponding functions; and
output the one or more function description of the corresponding functions with the corresponding processing information received.

17. A system comprising at least:
one service center comprising memory and at least one first apparatus;
one site comprising at least one second apparatus;
one or more communications networks between the service center and the site; and
a mobile user apparatus configured to establish a connection to the service center via at least one of the one or more communications networks and, when located on the site, a local connection to the second apparatus,
wherein
the first apparatus is configured to receive, as a user input, one or more function description selections for the second apparatus; to retrieve from the memory in the service center at least one set of associations, an association in a set of associations associating an identifier of a function to a function description of the function, the identifier being unambiguous within the set of associations; convert the one or more function description selections into corresponding identifiers of corresponding functions; to add the one or more identifiers of the corresponding functions to a function plan for the second apparatus; and to store the function plan comprising the identifiers of the corresponding functions to the memory in the service center to be forwarded to the user apparatus;
the user apparatus is further configured to maintain in a memory at least one set of associations, an association in a set of associations associating an identifier of a function to a first apparatus function description of the function; to receive from the service center a function plan comprising one or more identifiers of the functions; convert an identifier of a function in the function plan to a corresponding function description of the function, by using a set of associations in the memory; and to output the function description of the function to a user of the user apparatus.

18. The system of claim 17, wherein
the service center is further configured to send the function plan comprising the identifiers of corresponding functions in response to a request for the function plan from the user apparatus; and
the user apparatus is further configured to send to the service center the request for the function plan; and to receive the function plan as a response to the request.

19. The system of claim 17, wherein the function plan is for remote maintenance of the second apparatus, and the second apparatus is a drive connectable to the mobile apparatus via a terminal device.

* * * * *